W. B. HATCH.

Spring Bed Bottom.

No. 9,576. Reissued Feb. 15, 1881.

*Witnesses:*

C. B. Burgess.

Edwd. S. Hedly

*Inventor:*

Wm. B. Hatch, by Geo. B. Selden,

Atty.

N. PETERS, PHOTO-LITHOGRAPHER, WASHINGTON, D. C.

UNITED STATES PATENT OFFICE.

WILLIAM B. HATCH, OF ELMIRA, NEW YORK.

SPRING BED-BOTTOM.

SPECIFICATION forming part of Reissued Letters Patent No. 9,576, dated February 15, 1881.

Original No. 179,190, dated June 27, 1876. Application for reissue filed January 12, 1881.

*To all whom it may concern:*

Be it known that I, WILLIAM B. HATCH, of Elmira, in the county of Chemung, in the State of New York, have invented certain new and useful Improvements in Bed-Bottoms; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to that class of spring bed-bottoms where the mattress is supported directly upon the springs; and it consists in connecting the slats together by means of spiral spring-coils.

It also consists in connecting together the upper ends of the upright spiral springs by diagonally-arranged spiral coils.

My invention further consists in the construction of the hinges that unite the head part of the frame to the main part, and also in the construction and arrangement of the devices for raising and lowering said head part, all as hereinafter more fully set forth.

Figure 1:
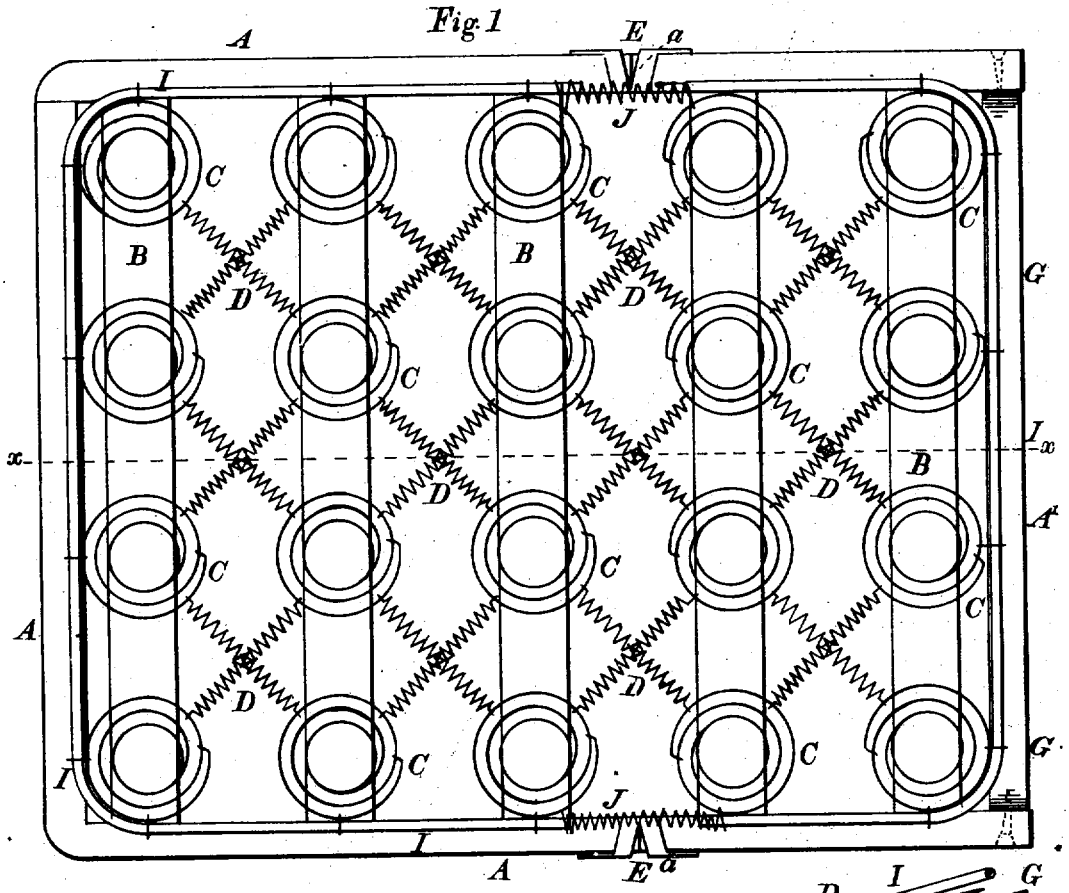
Figure 2:
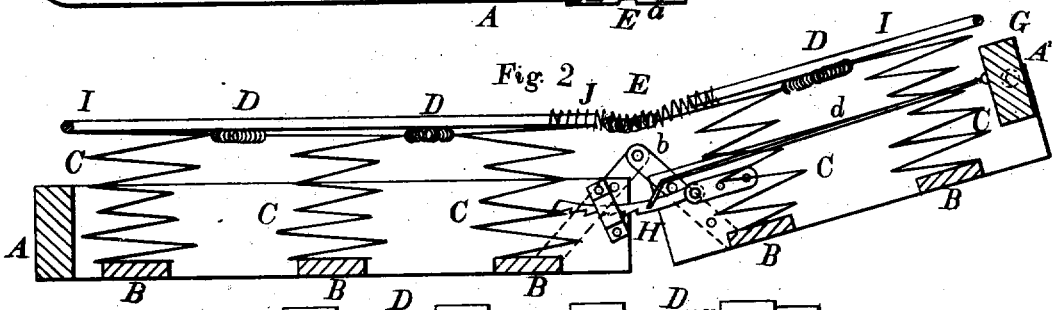
Figure 3:
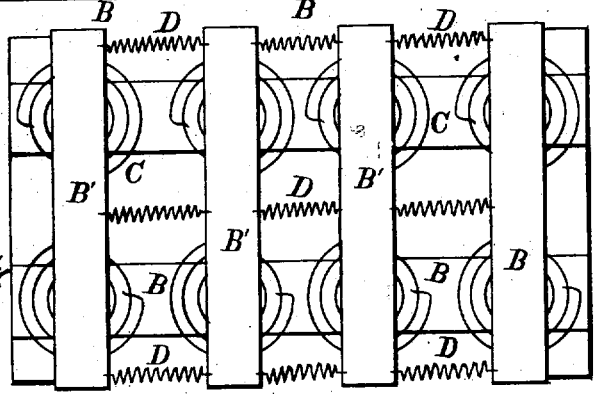

In the annexed drawings, Figure 1 is a top view of a device embodying my invention. Fig. 2 is a longitudinal section on line *x x*, Fig. 1; and Fig. 3 represents a top view of the frame, showing the manner of connecting the top slats by coiled springs.

A represents the frame of my bed-bottom, having a series of cross-bars, B B, upon which the springs C C are secured. The bottoms of the springs C rest upon the cross-bars B, and the springs C support at the top the longitudinal slats B′, as shown in Fig. 3, making the top of the bed elastic or flexible, and preventing the mattress from sinking between the springs, so that the top of the springs will be more sensitive to the weight placed upon the bed. The springs D may be arranged as shown in Fig. 1, the upright springs C C C being connected together at their upper ends by the diagonally-arranged cross-coils D D D.

The head part A′ of the frame A is hinged to the main part thereof by means of hinges E E, which are secured to the sides of the frame, and then bent over so as to rest on the edge of the frame, as shown at *a a*, and at the inner side of the frame are upward projections *b b*, pivoted together. The shoulders *a* of the hinges, that rest on the top edge of the frame, take the strain off from the screws which fasten the hinges to the side of the frame, and bring nearly all the bearing and strain on the top edge, so that the hinges will not be broken off by heavy weight.

Across the head part A′ of the frame is a rod or bar, G, with screws or pivots in the ends, so as to roll backward and forward. This rocking bar is, by wires *d d*, connected with the ratchets H H, to raise the same up, so as to elevate the head or lower it by rocking the bar backward or forward for that purpose. This can be done with one hand on either side of the bed. There is nothing to get out of order, and it is simple and easy to handle at all times.

The tops of the springs C are surrounded by a rattan band, I, fastened to the springs. This band is divided at the division of the frame, and the ends connected by means of spiral coils J J, so as to allow for the raising and lowering of the head.

Having thus fully described my invention, what I claim as new, and desire to secure by Letters Patent, is—

1. In a spring bed-bottom having a divided frame, A A′, the hinges E E, formed with the shoulders *a a* and projections *b b*, substantially as and for the purposes herein set forth.

2. The combination, with the divided frame A A′, of the rocking bar G, wires *d d*, and ratchets H H, substantially as and for the purposes set forth.

3. In combination with the coiled springs C and the longitudinal slats B′, supported upon the same, the coiled springs D, arranged between the slats, as and for the purpose herein set forth.

4. In a spring bed-bottom, the combination, with the frame A and lower cross-bars, B B B, of the coiled weight-supporting springs C C C, connected together at their upper ends by the diagonally-arranged spiral coils D D D, substantially as described.

In testimony that I claim the foregoing as my own I affix my signature in the presence of two witnesses.

WM. B. HATCH.

Witnesses:

HENRY M. MATTHEWS,
EDWIN N. HOWE.